(12) United States Patent
Bosscher et al.

(10) Patent No.: US 8,527,091 B2
(45) Date of Patent: Sep. 3, 2013

(54) ROBOTIC APPARATUS IMPLEMENTING COLLISION AVOIDANCE SCHEME AND ASSOCIATED METHODS

(71) Applicant: Harris Corporation, Melbourne, FL (US)

(72) Inventors: Paul Michael Bosscher, West Melbourne, FL (US); Daniel Ryan Hedman, Palm Bay, FL (US)

(73) Assignee: Harris Corporation, Melbourne, FL (US)

( * ) Notice: Subject to any disclaimer, the term of this patent is extended or adjusted under 35 U.S.C. 154(b) by 0 days.

(21) Appl. No.: 13/760,545

(22) Filed: Feb. 6, 2013

(65) Prior Publication Data

US 2013/0151008 A1 Jun. 13, 2013

Related U.S. Application Data

(62) Division of application No. 12/559,698, filed on Sep. 15, 2009, now Pat. No. 8,386,080.

(51) Int. Cl.
*G05B 19/418* (2006.01)
*G06F 19/00* (2011.01)

(52) U.S. Cl.
USPC ........... 700/248; 700/245; 700/247; 700/249; 700/250; 700/254; 700/258; 700/259; 700/261; 700/262; 700/264

(58) Field of Classification Search
USPC .................. 700/245, 247, 249, 250, 254, 258, 700/259, 261, 262, 264
See application file for complete search history.

(56) References Cited

U.S. PATENT DOCUMENTS

| | | | | |
|---|---|---|---|---|
| 4,412,293 A | * | 10/1983 | Kelley et al. | 700/259 |
| 4,578,757 A | | 3/1986 | Stark | |
| 4,831,549 A | * | 5/1989 | Red et al. | 700/254 |
| 5,150,452 A | * | 9/1992 | Pollack et al. | 700/255 |
| 5,204,942 A | | 4/1993 | Otera et al. | |
| 5,247,608 A | * | 9/1993 | Flemming et al. | 700/255 |
| 5,280,431 A | * | 1/1994 | Summerville et al. | 701/24 |
| 5,457,367 A | * | 10/1995 | Thorne | 318/568.11 |
| 5,561,742 A | * | 10/1996 | Terada et al. | 700/255 |
| 5,579,444 A | * | 11/1996 | Dalziel et al. | 700/259 |
| 5,675,720 A | | 10/1997 | Sato et al. | |
| 5,798,627 A | | 8/1998 | Gilliland et al. | |
| 5,920,678 A | * | 7/1999 | Watanabe et al. | 700/255 |
| 5,959,425 A | * | 9/1999 | Bieman et al. | 318/568.15 |
| 6,004,016 A | * | 12/1999 | Spector | 700/56 |
| 6,212,444 B1 | | 4/2001 | Kato et al. | |

(Continued)

FOREIGN PATENT DOCUMENTS

EP 1901151 3/2008
WO 2009055707 4/2009

*Primary Examiner* — Ian Jen
(74) *Attorney, Agent, or Firm* — Allen, Dyer, Doppelt, Milbrath & Gilchrist, P.A.

(57) ABSTRACT

A robotic system implements a collision avoidance scheme and includes a first robotic manipulator and a first controller configured to control the first robotic manipulator for movement along a first pre-planned actual path. A second controller is configured to control movement of a second robotic manipulator for movement along a second pre-planned intended path and deviating therefrom to move in a dodging path away from the first pre-planned actual path based upon determining a potential collision with the first robotic manipulator without prior knowledge of the first pre-planned actual path.

23 Claims, 9 Drawing Sheets

(56) References Cited

U.S. PATENT DOCUMENTS

| | | | |
|---|---|---|---|
| 6,243,621 B1* | 6/2001 | Tao et al. | 700/245 |
| 6,445,964 B1* | 9/2002 | White et al. | 700/61 |
| 6,526,373 B1* | 2/2003 | Barral | 703/6 |
| 6,717,382 B2* | 4/2004 | Graiger et al. | 318/587 |
| 7,298,385 B2* | 11/2007 | Kazi et al. | 345/633 |
| 7,322,510 B2* | 1/2008 | Kraus | 228/4.1 |
| 2001/0004718 A1* | 6/2001 | Gilliland et al. | 700/255 |
| 2003/0225479 A1 | 12/2003 | Waled | |
| 2005/0246062 A1* | 11/2005 | Keibel | 700/245 |
| 2005/0273200 A1* | 12/2005 | Hietmann et al. | 700/248 |
| 2006/0108960 A1* | 5/2006 | Tanaka et al. | 318/568.21 |
| 2006/0149418 A1* | 7/2006 | Anvari | 700/245 |
| 2006/0241813 A1* | 10/2006 | Babu et al. | 700/255 |
| 2008/0114492 A1* | 5/2008 | Miegel et al. | 700/248 |
| 2008/0150965 A1* | 6/2008 | Bischoff et al. | 345/632 |
| 2008/0288109 A1* | 11/2008 | Tao et al. | 700/255 |
| 2008/0319557 A1* | 12/2008 | Summers et al. | 700/19 |
| 2009/0003975 A1* | 1/2009 | Kuduvalli et al. | 414/146 |
| 2009/0043440 A1 | 2/2009 | Matsukawa et al. | |

\* cited by examiner

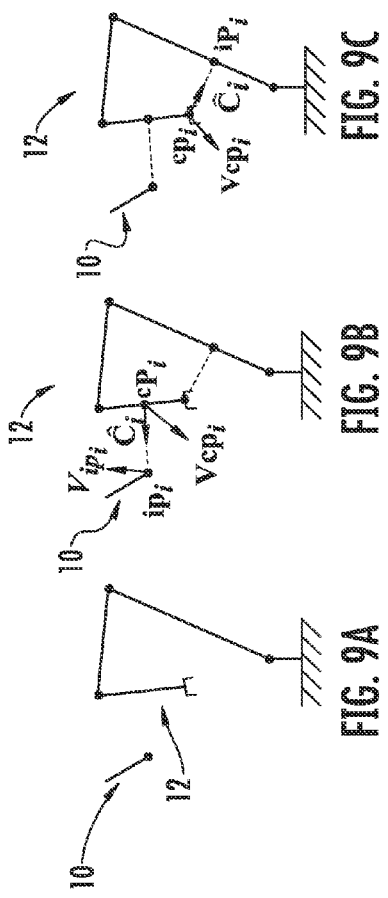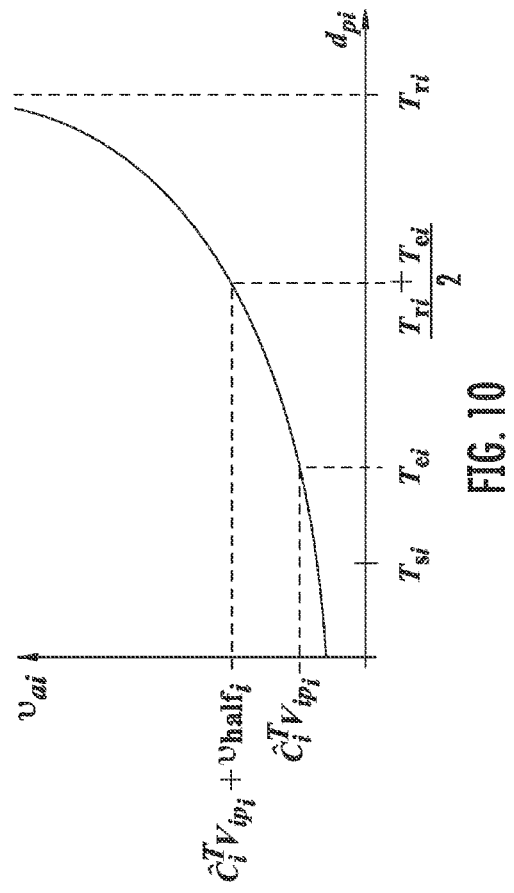

ROBOTIC APPARATUS IMPLEMENTING COLLISION AVOIDANCE SCHEME AND ASSOCIATED METHODS

FIELD OF THE INVENTION

The present invention relates to the field of robotics, and, more particularly, to collision avoidance for robotic manipulators and related methods.

BACKGROUND OF THE INVENTION

Robotic systems are commonplace in fields such as manufacturing. Indeed, manufacturing plants typically employ robotic systems including numerous robotic manipulators to perform various tasks. To avoid damage to the robotic manipulators, it is helpful to control the robotic manipulators according to a collision avoidance scheme. As such, a variety of collision avoidance schemes for robotic systems have been developed.

Some collision avoidance schemes work by constraining each robotic manipulator to pre-planned collision free paths. For example, one such collision avoidance scheme is disclosed in U.S. Pat. No. 5,204,942 to Otera et al. Such a collision avoidance scheme typically requires reprogramming to accommodate each and every change made to the pre-planned paths of the robotic manipulators. In a manufacturing process that is routinely altered and updated, the collision avoidance system of Otera et al. may be disadvantageous due to the necessary repeated reprogramming thereof.

Other collision avoidance schemes may model a workspace and divide it into different zones. Certain robotic manipulators may be forbidden to enter certain zones, or only one robotic manipulator may be allowed into a given zone at a time. U.S. Pat. No. 5,150,452 to Pollack et al. discloses such a collision avoidance scheme for a robotic system. The robotic system includes a controller storing a model of the workspace that is divided into an occupancy grid. The controller controls the robotic manipulators of the robotic system such that only one robotic manipulator may occupy a cell of the occupancy grid at a given time. This collision avoidance system may reduce the efficiency of a manufacturing plant, particularly if there are a variety of differently sized robotic manipulators and the cell sizes of the occupancy grid are sized to accompany the largest robotic manipulators. Further, since this robotic system operates based upon a model of the workspace, any change to the workplace may require an update of the model, which may be time consuming.

Other attempts at collision avoidance schemes for robotic systems include a controller that actively looks for potential collisions between robotic manipulators. For example, U.S. Pat. No. 4,578,757 to Stark discloses a collision avoidance scheme for a robotic system that models each robotic manipulator of the system as a number of overlapping spheres. As the robotic manipulators move along pre-planned paths, the distance between each sphere of nearby robotic manipulators is calculated by a controller. These calculated distances indicate a risk of collision between two adjacent robotic manipulators. When the risk of collision exceeds a threshold amount, at least one of the robotic manipulators may be slowed down as it travels along its pre-planned path, or even stopped completely. Such a collision avoidance scheme, however, may reduce the efficiency of a manufacturing plant employing the robotic system due to the stopping of robotic manipulators and the associated delays in the manufacturing process.

As explained, these prior approaches may render a manufacturing process employing their respective robotic systems inefficient. Moreover, robotic systems employing these prior approaches may be difficult and/or costly to adapt to new applications or to the addition of additional robotic manipulators. As such, further advances in the field of collision avoidance schemes may be desirable.

SUMMARY OF THE INVENTION

In view of the foregoing background, it is therefore an object of the present invention to provide a more efficient collision avoidance scheme for a robotic apparatus.

This and other objects, features, and advantages in accordance with the present invention are provided by a robotic manipulator that detects a potential collision with another robotic manipulator, and moves in a dodging path based upon detection of the potential collision. More particularly, the robotic apparatus may comprise a first robotic manipulator, and a first controller configured to control the first robotic manipulator for movement along a first pre-planned actual path. In addition, the robotic apparatus may include a second robotic manipulator, and a second controller configured to control movement of the second robotic manipulator for movement along a second pre-planned intended path. The second robotic manipulator deviates therefrom to move in a dodging path away from the first pre-planned actual path based upon determining a potential collision with the first robotic manipulator and without prior knowledge of the first pre-planned actual path.

This collision avoidance scheme advantageously allows the first pre-planned actual path of the first robotic manipulator to be reprogrammed without necessitating a reprogramming of the second pre-planned intended path. This may reduce the time it takes to adapt the robotic apparatus to a new application.

The first controller may generate first drive signals for the first robotic manipulator, and the second controller may determine the potential collision based upon the first drive signals. Additionally or alternatively, the first robotic manipulator may include at least one joint, and a joint sensor cooperating with the at least one joint and the first controller for determining positioning of the at least one joint. The second controller may determine the potential collision based upon the positioning of the at least one joint of the first robotic apparatus. This may allow the determination of potential collisions more accurately and with the use of less processing power than through the use of an image sensor. Of course, the second controller may also determine the potential collision based upon an image sensor or joint position sensor in some embodiments.

The second controller may repeatedly determine a distance between the second robotic manipulator and the first robotic manipulator, and, may compare the distance to a threshold distance to thereby determine a potential collision. In addition, the second controller may also repeatedly determine an approach velocity between the second robotic manipulator and the first robotic manipulator, and the second controller may also determine the potential collision based upon the approach velocity.

Furthermore, the second controller may also repeatedly determine an approach velocity between the second robotic manipulator and the first robotic manipulator, and the second controller may also determine the potential collision based upon the approach velocity. The second controller may move the second robotic manipulator at different speeds based upon the approach velocity. The second controller may also repeatedly determine an acceleration of the first robotic manipulator, and the second controller may also determine the potential collision based upon the acceleration.

In addition, the second controller may store a geometric model of the first and second robotic manipulators, and the second controller may determine the distance between the second robotic manipulator and the first robotic manipulator based upon the geometric models. The use of geometric models may greatly reduce the processing power consumed in determining potential collisions.

Each geometric model may include a series of buffer zones surrounding a respective robotic manipulator. The second controller may determine a potential collision between the second robotic manipulator and the first robotic manipulator based upon an overlap between the buffer zones. In addition, the second controller may move the second robotic manipulator at different speeds based upon which respective buffer zones are overlapping.

The second pre-planned intended path may be based upon a sequence of desired velocities. The second controller may move the second robotic manipulator along the dodging path based upon a sequence of dodge velocities to avoid the potential collisions while closely following the sequence of desired velocities of the second pre-planned intended path.

The second robotic manipulator may comprise at least one joint, and the second controller may determine the sequence of dodge velocities based upon a force on the at least one joint. Additionally or alternatively, the second controller may also determine the sequence of dodge velocities upon kinetic energy of the second robotic manipulator. Determining the sequence of dodge velocities based upon a force or torque on the at least one joint, or based upon kinetic energy of the second robotic manipulator, may advantageously constrain the second robotic manipulator from advancing along a dodge velocity or path that would be potentially damaging to its hardware.

The sequence of dodge velocities may comprise at least one velocity in each of a plurality of physical directions. The second controller may determine the sequence of dodge velocities based upon a plurality of convex sets of allowable velocities.

A method aspect is directed to a method of operating a robotic apparatus according to a collision avoidance scheme to avoid a collision with a first robotic manipulator controlled by a first controller for movement along a first pre-planned actual path. The method may comprise controlling a second robotic manipulator with a second controller for movement along a second pre-planned intended path. The method may further include controlling the second robotic manipulator with the second controller for movement in a dodging path away from the first pre-planned actual path based upon determining a potential collision with the first robotic manipulator and without prior knowledge of the first pre-planned actual path.

BRIEF DESCRIPTION OF THE DRAWINGS

FIG. 9A is a schematic side view of first and second robotic manipulators.

FIG. 9B is a schematic side view of first and second robotic manipulators including vectors used in determining the dodging path.

FIG. 9C is a schematic side view of first and second robotic manipulators including vectors used in determining the dodging path.

FIG. 10 is a chart illustrating the calculation of an approach velocity using in determining the dodging path.

DETAILED DESCRIPTION OF THE PREFERRED EMBODIMENTS

The present invention will now be described more fully hereinafter with reference to the accompanying drawings, in which preferred embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like numbers refer to like elements throughout, and prime and multiple prime notations are used to indicate similar elements in alternative embodiments.

Figure 1:
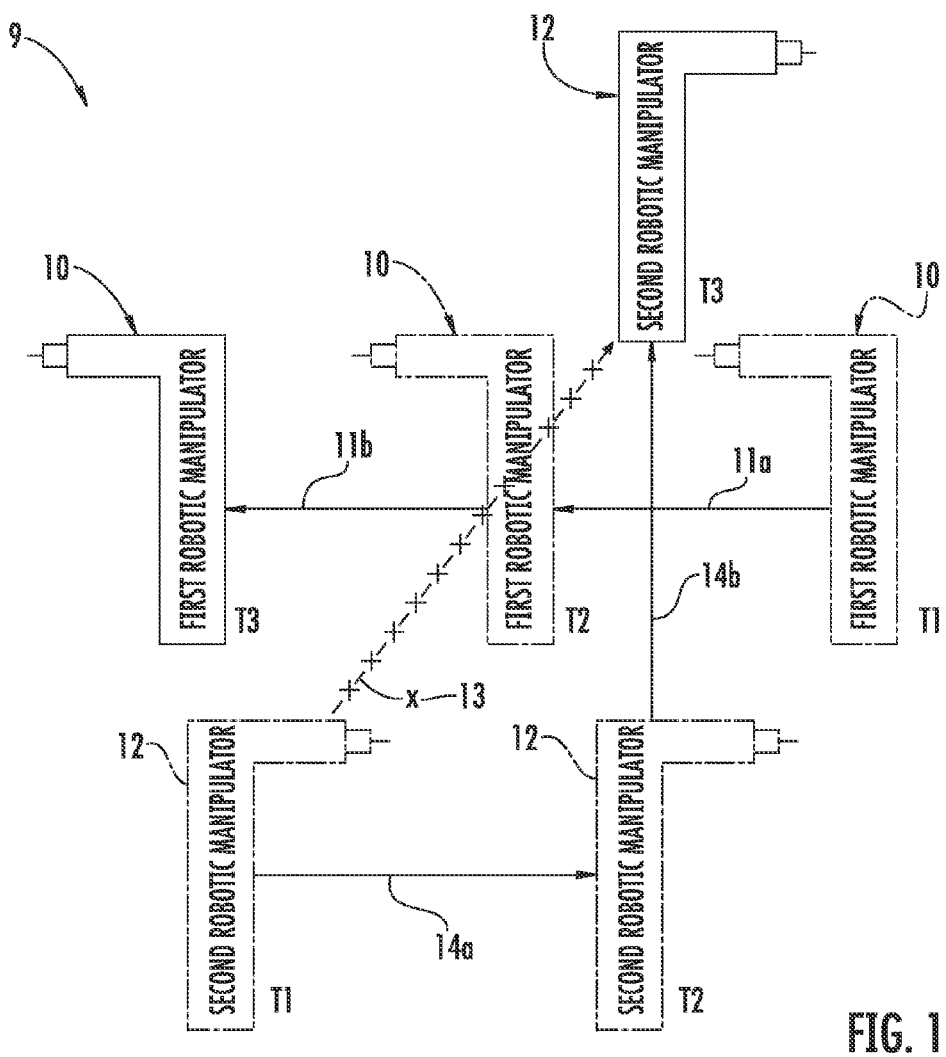
FIG. 1 is a schematic side view of a robotic apparatus implementing a collision avoidance scheme, in accordance with the present invention.
Figure 2:
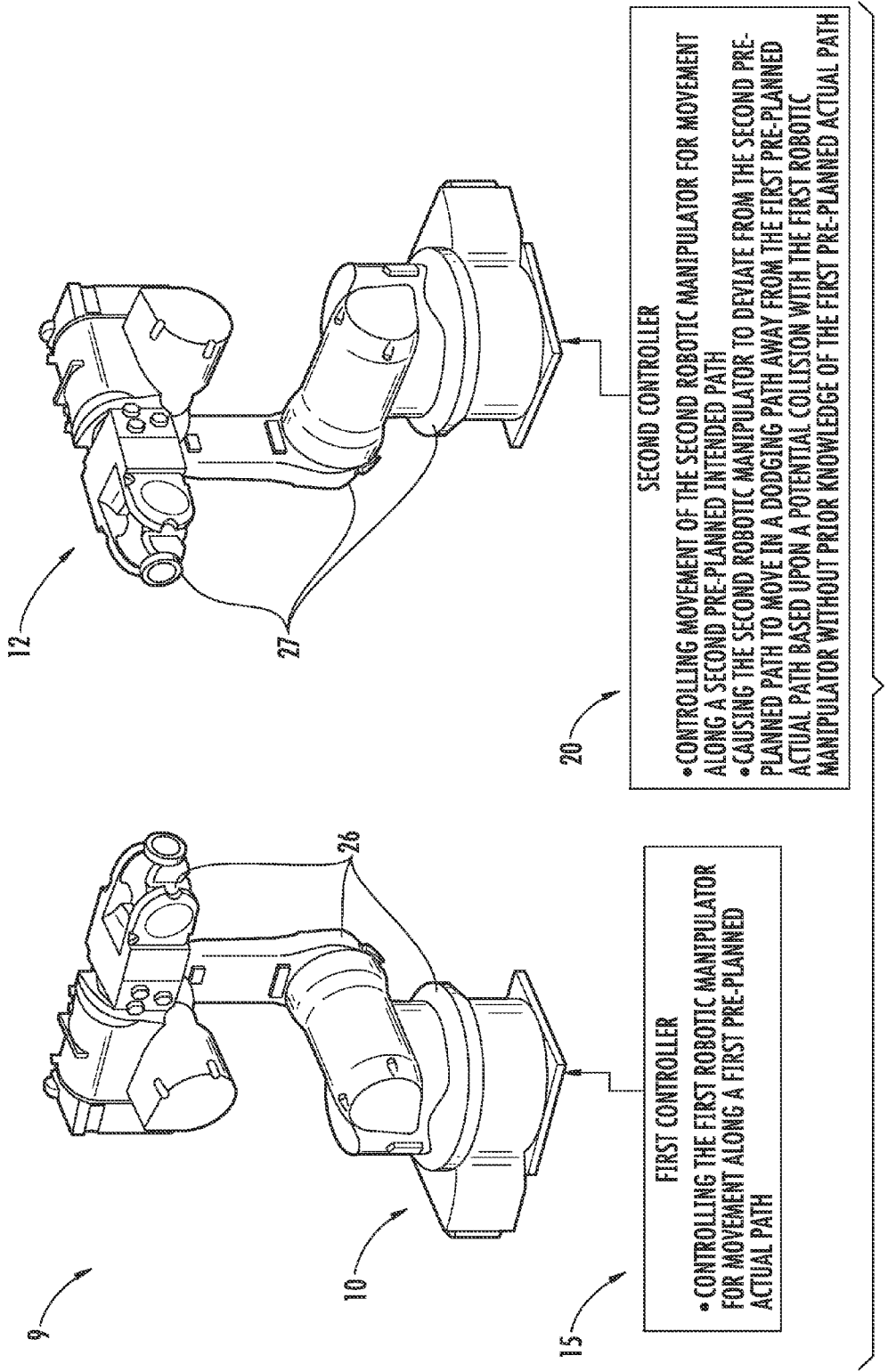
FIG. 2 is schematic perspective of the robotic apparatus of FIG. 1.

Referring initially to FIGS. 1-2, a robotic apparatus 9 implementing a collision avoidance scheme is now described. The robotic apparatus 9 includes a first robotic manipulator 10 and a first controller 15 configured to control the first robotic manipulator for movement along a first pre-planned actual path 11a, 11b. In addition, there is a second robotic manipulator 12 and a second controller 20. The second controller 20 is configured to control movement of the second robotic manipulator 12 for movement along a second pre-planned intended path 13. The second controller 20, without prior knowledge of the first pre-planned actual path 11a, 11b, causes the second robotic manipulator 12 to deviate from the second pre-planned intended path 13 to move in a dodging path 14a, 14b away from the first pre-planned actual path, and thus the first robotic manipulator 10, based upon determining a potential collision therewith. Further details of the derivation of the dodging path 14a, 14b will be given below.

Those skilled in the art will recognize that the robotic apparatus 9 may include any number of robotic manipulators and that the first and second robotic manipulators 10, 12 may be any suitable robotic manipulators, for example, robotic welding arms, or robotic claws for handling objects and/or tools. Of course, the first and second robotic manipulators 10, 12 may be different types of robotic manipulators and may vary in size.

The first pre-planned actual path 11a, 11b, in other embodiments, may include continuous or discontinuous movement in any direction, and may include movement of joints 26 of the first robotic manipulator 10. Likewise, the second pre-planned intended path 13 may, in other embodiments include continuous or discontinuous movement in any direction, and may include movement of joints 27 of the second robotic manipulator 12. In the embodiment as shown in FIG. 1, the paths have been simplified to linear movements for clarity of explanation.

The application of this collision avoidance scheme, at three discrete moments in time, is illustrated in FIG. 1. Here, the first robotic manipulator 10 is being controlled by the first controller 15 (FIG. 2) for movement along the first pre-planned actual path 11, including a first segment 11*a* beginning at a first time (T1), continuing along a second segment 11*b* at a second time (T2) and ending at a third time (T3).

A second controller 20 (FIG. 2) is controlling the second robotic manipulator 12 for attempted movement along the second pre-planned intended path 13. However, at T1, the second controller 20 detects that the second robotic manipulator 12 would collide with the first robotic manipulator 10. Therefore, the second controller 20 causes the second robotic manipulator 12 to instead follow the dodge path, segments 14*a*, 14*b*, so that, at T2 and T3, it does not collide with the first robotic manipulator 10. The dodge path 14*am*, 14*b* not only takes the second robotic manipulator 12 out of danger of colliding with the first robotic manipulator 10, but may also advantageously follow the second pre-planned intended path 13 as closely as possible. In the illustrated example, the second robotic manipulator 12 illustratively ends up in a same position at T3 as where it would have been had it followed the second pre-planned intended path 13.

Those skilled in the art will understand that the second controller 20 may repeatedly search for potential collisions with the first robotic manipulator 10, and may repeatedly adjust the dodge path 13 based thereupon, for example, every 2 milliseconds.

Figure 3:
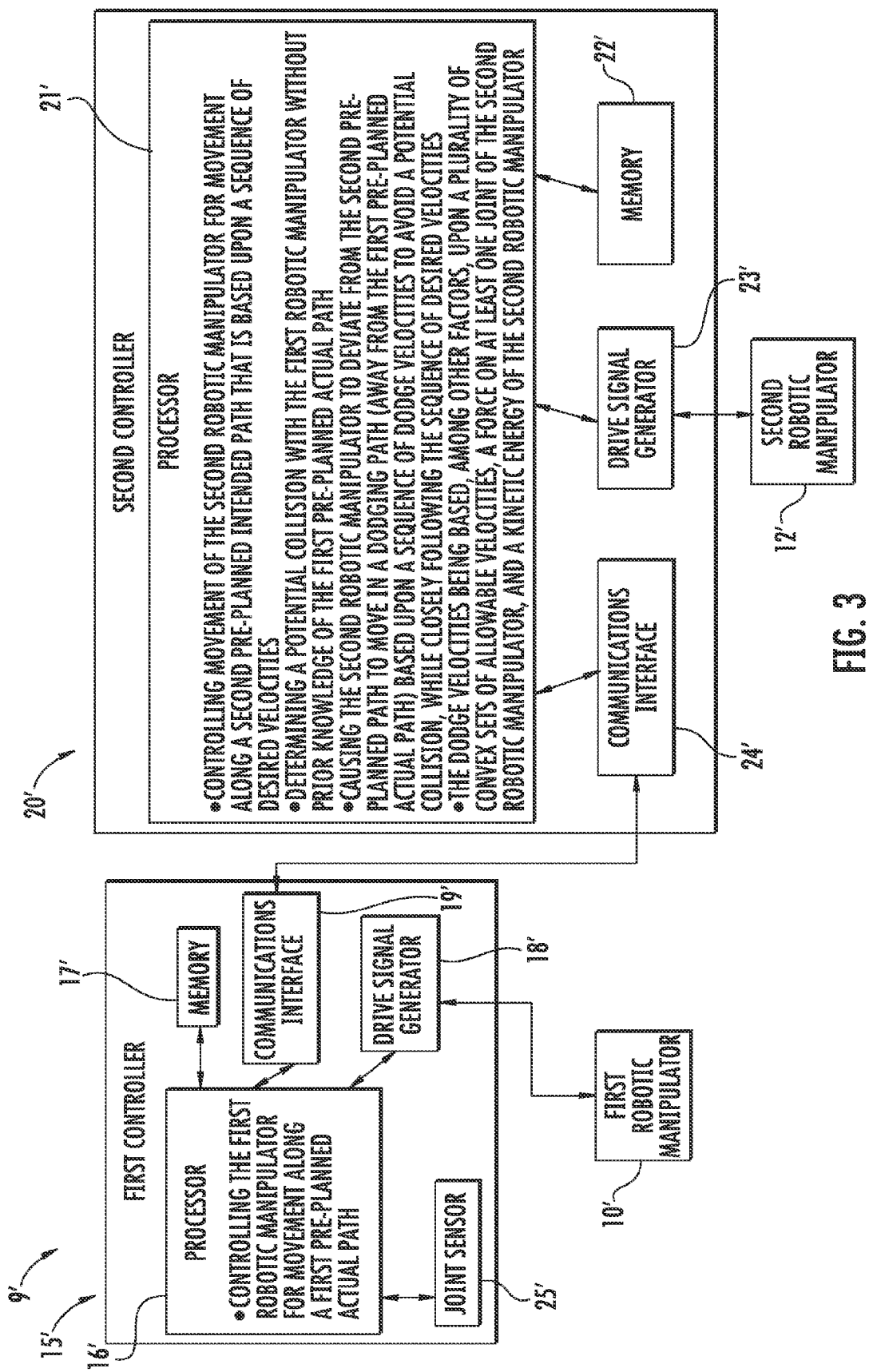
FIG. 3 is a schematic block diagram of a further embodiment of a robotic apparatus implementing a collision avoidance scheme, in accordance with the present invention.

A further embodiment of the robotic apparatus 9' is now described with reference to FIG. 3. Here, the first controller 15' comprises a memory 17' cooperating with a processor 16' for controlling the first robotic manipulator 10' for movement along the first pre-planned actual path. The processor 16' sends drive instructions to the drive signal generator 18', which in turn generates and sends first drive signals to the first robotic manipulator 10'. The first robotic manipulator 10' moves along the first pre-planned actual path based upon the first drive signals.

The second controller 20' comprises a processor 21' and a memory 22' cooperating for controlling movement of the second robotic manipulator 12' along the second pre-planned intended path. Here, the second pre-planned intended path is based upon a sequence of desired velocities. The processor 21' sends drive instructions to the drive signal generator 23', which in turn generates and sends second drive signals to the second robotic manipulator 12'. The second robotic manipulator 12' moves along the second pre-planned intended path based upon the second drive signals.

The processor 21' determines a potential collision with the first robotic manipulator 10' without prior knowledge of the first pre-planned actual path. To effectuate this determination, a communications interface 24' of the second controller 20' is coupled to the communications interface 19' of the first controller 15' to read the first drive signals. The processor 21' cooperates with the communications interface 24' to thereby determine a potential collision based upon the first drive signals. This advantageously allows a quick and accurate determination of the velocity of each portion of the first robotic manipulator 10' and thus the first pre-planned actual path.

When the processor 21' determines a potential collision of the second robotic manipulator 12' and the first robotic manipulator 10', it causes the second robotic manipulator to deviate from the second pre-planned path and instead move in a dodging path (away from the first pre-planned actual path and thus the first robotic manipulator) based upon a sequence of dodge velocities.

Figure 4:
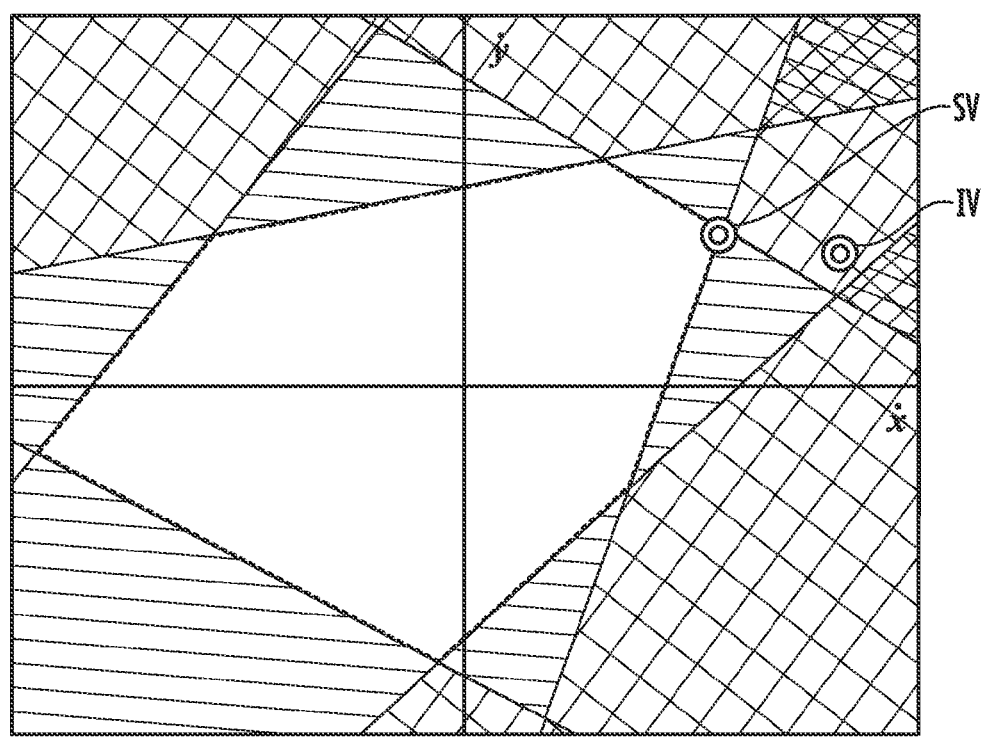
FIG. 4 is a graph illustrating the selection of a dodge velocity by the robotic apparatus of FIG. 3.

The processor 21' may select each of the sequence of dodge velocities from a set of potential dodge velocities. Such a set of potential dodge velocities is illustrated in the two-dimensional graph of FIG. 5. The crosshatched areas in FIG. 5 indicate velocities that, if followed by the second robotic manipulator 12', would result in a collision with the first robotic manipulator 10'. The polygonal non-crosshatched area of FIG. 5 indicates a set of collision free dodge velocities. The second pre-planned intended path may be based upon a sequence of desired velocities, and, in selecting each of the sequence of dodge velocities, the processor 21' may choose dodge velocities closest to the desired velocities. As shown in FIG. 4, the selected velocity SV is shown adjacent to the intended velocity IV.

The dodge velocities may also be based, among other factors, on a torque on a joint of the second robotic manipulator 12' and/or a kinetic energy of the second robotic manipulator (or based upon some objective function dealing with the robot—some kinematic, dynamic, etc., rule for choosing desired velocities—however optimal is defined for the robot system). For example, certain joints of the second robotic manipulator 12' may have a torque limit, and moving the robotic manipulator at a velocity that would cause those joints to exceed that torque limit is undesirable. Basing the dodge velocities on a torque on a joint or a kinetic energy of the second robotic manipulator may advantageously help ensure that the second robotic manipulator 12' is not damaged during movement according to the sequence of dodge velocities, or that a tool or object carried by the second robotic manipulator is not damaged during movement according to a dodge velocity. The determination of these dodge velocities will be described in detail below.

Figure 5:
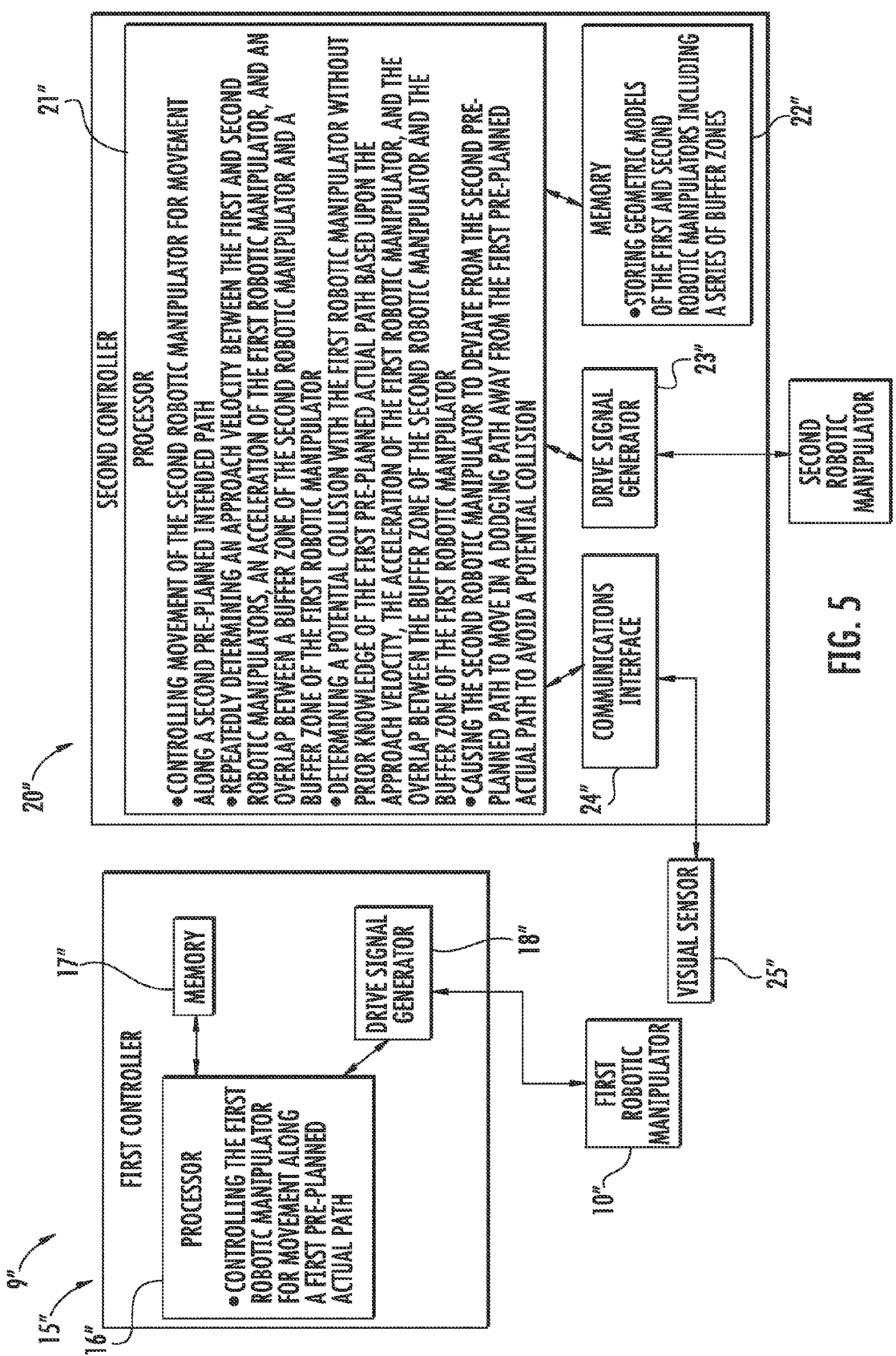
FIG. 5 is a schematic block diagram of yet another embodiment of a robotic apparatus implementing a collision avoidance scheme, in accordance with the present invention.

With additional reference to FIG. 5, yet another embodiment of a robotic apparatus 9" implementing a collision avoidance scheme is now described. The first robotic manipulator 10" and first controller 15" are similar in structure and function to the first robotic manipulator 10' and first controller 15' described above, and thus no further description thereof is needed.

The second controller 20" comprises a processor 21", memory 22", drive signal generator 23", and communications interface 24" as described above with reference to the second controller 20'. However, here, the memory 22" stores geometric models of the first and second robotic manipulators. The processor 21" of the second controller 20" may generate the geometric models, or this data may be communicated to the second controller and stored in the memory 22" thereof.

To generate the geometric models, each robotic manipulator 10", 12" is first represented as a set of geometric primitives. The geometric primitives include points, line segments, and rectangles. To complete the geometric models, the first and second robotic manipulators 10", 12" as then represented as swept spherical bodies. These swept spherical bodies comprise the set of points that are at a specified distance/radius from a respective geometric primitive. If the primitive is a point, the resulting body is a sphere. If the primitive is a line segment, the body is a cylinder with spherical endcaps, also known as a cyclisphere. If the primitive is a rectangle, the body is a box with rounded edges. For ease of reading, these bodies will hereinafter be referred to as "cyclispherical shells," but it should be appreciated that they may take other shaped, as described above.

Figure 6:
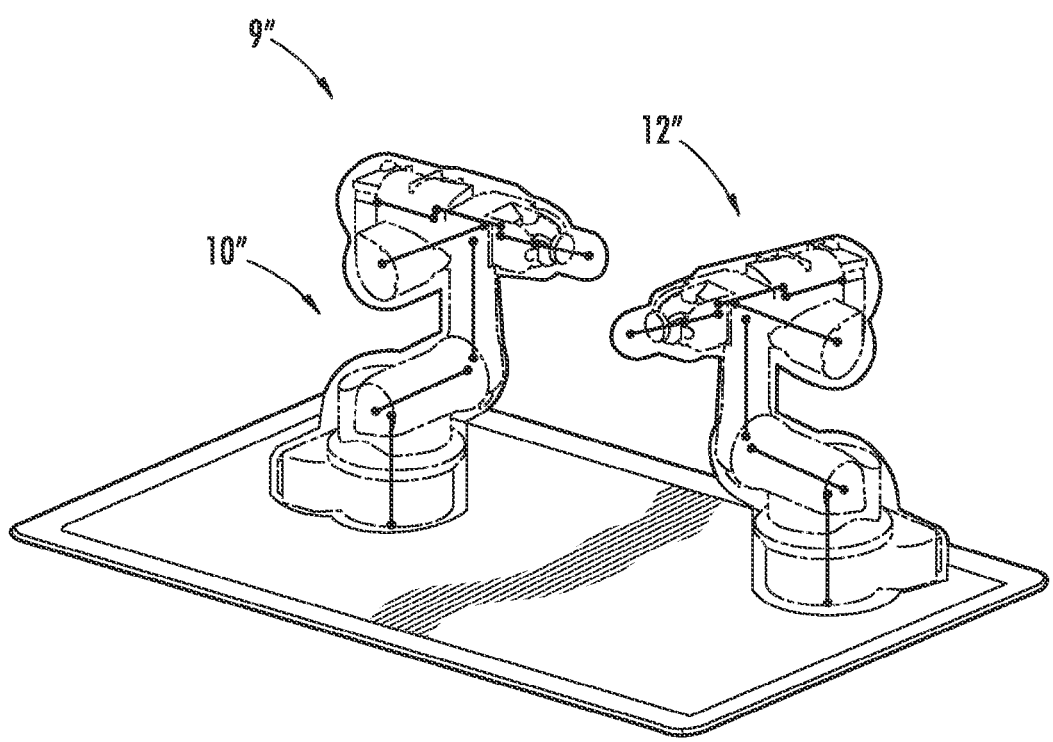
FIG. 6 is a perspective view of the robotic apparatus of FIG. 5.

As shown in FIG. 6, a geometrically complex set of objects (here, robotic manipulators) can be approximated by a collection of cyclispherical shells. To more clearly illustrate the distinct cyclispherical shells, the geometric primitive for each shell is superimposed over the shell. Each robotic manipulator 10", 12" in FIG. 6 is approximated by eight cyclispherical shells (as can be seen from the eight line segments for each). As a result, the complete geometric model of the robotic manipulators 10", 12" and their surroundings at a given instant can be represented by a list of bodies, the respective body types (i.e. point, line segment, or plane), the locations of the corner/end points on each body, and the radius associated with each body.

The primary advantage of using such a method for approximating the robotic manipulators of the robotic apparatus is the simplicity in calculating the distance between the robotic manipulators. The distance $d(j,k)$ between objects j and k is simply $$d(j,k)=d_p(j,k)-r_j-r_k \quad (1)$$

where $d_p(j,k)$ is the distance between the primitives of objects j and k and $r_j$ and $r_k$ are the radii of objects j and k respectively. Calculating the distance between the primitives (points, line segments, rectangles) has a relatively straightforward closed-form solution in some cases.

Increasing the number of cyclispherical shells used per robotic manipulator can improve the accuracy of the geometric model, but at the cost of increased computation time. Those skilled in the art will appreciate that this is not the only possible method of simplifying the geometric model of the robotic apparatus. Any representation of the robotic apparatus that allows geometric calculations to be performed quickly would be an acceptable substitute.

Figure 7:
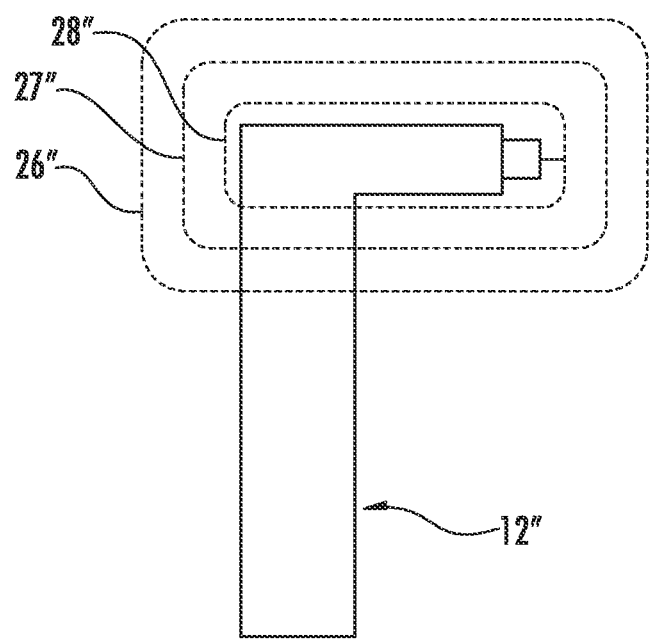
FIG. 7 is a schematic side view of a robotic manipulator surrounded by a series of buffer zones, in accordance with the present invention.
Figure 8:
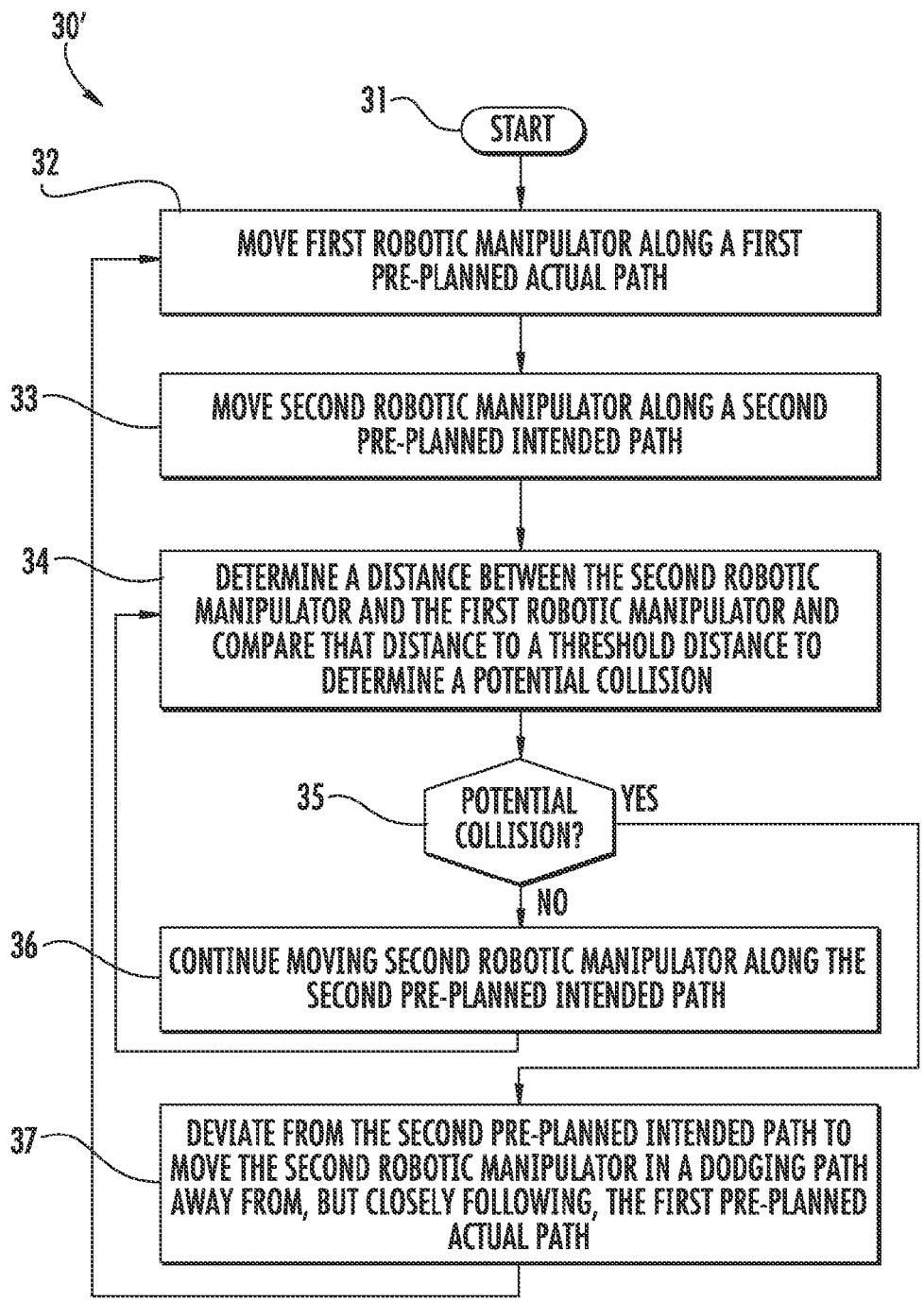
FIG. 8 is a flowchart of a method of operating a robotic apparatus according to a collision avoidance scheme, in accordance with the present invention.

As will be described below with respect to the calculation of a sequences of dodge velocities, a constraint generation portion of this collision avoidance scheme creates limits on the motion of the second robotic manipulator 12" based on how close it is to colliding with the first robotic manipulator 10". This is accomplished by creating a set of three buffer zones 26", 27", 28" for each geometric primitive. This is illustrated in FIG. 7, where the geometry of one link of the second robotic manipulator 12" has been modeled. The geometric primitive chosen is a line segment (not shown). Cyclispherical shells with three different radii are then constructed from this single geometric primitive.

In applying this collision avoidance scheme to the robotic apparatus of FIG. 5, the buffer zones 26", 27", 28" may be the same shape as the geometric models, for example, and the processor 21" may alter the dodge path based upon detecting an overlap between buffer zones of the first and second robotic manipulators 10", 12".

Referring still to FIG. 7, the buffer zones include a reaction buffer zone 26", an equilibrium buffer zone 27", and an object buffer zone 28". The reaction buffer zone 26" and equilibrium buffer zone 27" are used to gradually apply changes to the motion of the second robotic manipulator 12" as it approaches the first robotic manipulator 10". The object buffer zone 28" is the lower bound on how close the second robotic manipulator 12" should be allowed to be to the first robotic manipulator 10". In particular, the object buffer zone 28" of the second robotic manipulator 12" should not be allowed to contact the object buffer zone of the first robotic manipulator or a collision may result.

Referring again to FIG. 5, the processor 21" controls movement of the second robotic manipulator 12" for movement along the second pre-planned intended path via the drive signal generator 23", as described above. One or more visual sensors, illustratively a visual sensor 25", (can be any type of sensors, position sensor, motion sensor, etc.) are coupled to the communications interface 24". Those skilled in the art will understand that the image sensor (visual sensor 25") may be any suitable image sensor, such as a camera, and that there may be a plurality of such sensors. Additionally or alternatively, in other applications, there may be other types of sensors, for example radar or sonar.

The processor 21" determines a distance between a shell of the second robotic manipulator 12" and a shell of the first robotic manipulator 10", based upon the visual sensor 25", to detect a potential collision between the first and second robotic manipulators 10", 12". The potential collision may be detected based upon a buffer zone of the second robotic manipulator 12" overlapping a buffer zone of the first robotic manipulator 10".

In response to a potential collision, the processor 21" controls the second robotic manipulator 12" for movement in a dodge path to avoid a collision with the first robotic manipulator 10". The dodge path may depend upon which buffer zones of the first and second robotic manipulators 10", 12" overlap each other. For example, if the reaction buffer zones 26" of the first and second robotic manipulators 10", 12" overlap, the dodge path may take the second robotic manipulator 12" away from the first robotic manipulator 10", but at a lesser speed than the approach speed thereof. Since the reaction 26" buffer zones may be defined so as to be relatively large in comparison to the geometric model of their respective robotic manipulator, the second robotic manipulator 12" may simply not need to move at a speed greater or equal to the approach speed of the first robotic manipulator 10". Movement at such a lesser speed along the dodge path may conserve power, or may reduce wear and tear on the second robotic manipulator 12".

If the equilibrium buffer zones 27" of the first and second robotic manipulators 10", 12" overlap each other, the dodge path may take the second robotic manipulator 12" away from the first robotic manipulator 10" at the approach speed thereof. This may help to avoid a collision that would otherwise be unavoidable were the second robotic manipulator 12" to move at a slower speed. If the object buffer zones 28" of the first and second robotic manipulators 10", 12" contact each other, the dodge path may be an emergency stop. Moreover, if the object buffer zones 28" of the first and second robotic manipulators 10", 12" contact each other, the second controller 20" may shut down the robotic apparatus 9".

For compactness, each geometric primitive and the three shells associated with it shall collectively be referred to as a "body," denoted b. The set of bodies can be divided into two sets. The set of "robotic manipulator" bodies, R, are the bodies that are a part of the second robotic manipulator. The set of "object" bodies, O, are the other bodies (including the first robotic manipulator).

For each robotic manipulator body $b_j \in R$ it is helpful to then determine the set of the bodies $b_k \in (R \cup O)$ that could possibly collide with it. This is done in three steps. The first step is performed off-line prior to executing the collision avoidance scheme, and includes manually removing potential collision pairs $(b_j, b_k)$ from the list of possible collisions. Potential collision pairs removed in this step may not be checked for at any point in the collision avoidance scheme. This is primarily used to allow neighboring bodies to overlap each other without being flagged as a collision.

For example, in FIG. 6 some of the robotic manipulator bodies overlap each other. In this case it would be desirable ignore the overlap between neighboring bodies. However, this is not the case for all pairs of robot bodies. For example, it is desirable to prevent collision between certain bodies and the base of the robotic manipulator, the collision pair for those bodies would not be removed from the list of possible collisions.

The second step is performed after beginning execution of the collision avoidance scheme. The purpose of this step is to quickly check whether potential collision pairs ($b_j$, $b_k$) are far enough apart that they can be ignored at this instant. To implement this step, bounding boxes have been constructed around bodies in the workspace. The bounding boxes of each potential collision pair ($b_j$, $b_k$) are compared and if the bounding boxes do not overlap, that ($b_j$, $b_k$) pair can be excluded from the list of possible colliding bodies. This step is fast and may quickly eliminate potential collisions from consideration.

In the third step the actual distance between the bodies is calculated based upon the pairs ($b_j$, $b_k$) that were not eliminated in the first two steps. In particular, the distance between the geometric primitives associated with the bodies is calculated. Because of the simple geometric primitives chosen, this can be calculated very quickly. The output of this step is the shortest distance $d_p(j,k)$ between the primitives of ($b_j$, $b_k$) and the points on each of the primitives corresponding to this shortest distance. For the $i^{th}$ pair of ($b_j$, $b_k$) considered, this distance is referred to as $d_{pi}$ and these points are referred to as $cp_i$ (the "collision point"), and $ip_i$ (the "interfering point"), where $cp_i$ is on body $b_j$ and $ip_i$ is on body $b_k$.

It is worth noting that it may be helpful to modify the collision and distance check method described hereinbefore if a different geometric modeling approach were used.

Given the current state of the robotic apparatus (as represented by the geometric model) and the set of possible collisions, it is helpful to generate constraints on the allowed motion of the robot in order to avoid these collisions. In addition to avoiding collisions (both with the first robotic manipulator and with itself), it is helpful for the motion of the second robotic manipulator to not violate its joint angle limits or joint velocity limits.

To effectuate this, a set of linear inequality constraints on the commanded velocity of the first robotic manipulator is created. For convenience, these limits are formulated in the end-effector (task space) in the implementation described here. Note that because the Jacobian mapping of joint velocities to task space velocities is linear, these constraints can be expressed in either the joint space or the task space and they will still be linear. As a result, the set of allowable velocities of the robot at this instant forms a convex set. This structure is advantageous as it allows formulation of the velocity selection problem as a convex optimization. This optimization can be calculated very efficiently, which may allow collision-free motions to be computed in real time.

The form of the convex optimization problem is $$\text{minimize } f_0(x)$$

$$\text{subject to } f_i(x) \leq 0, i=1,\ldots,\kappa \quad (2)$$

where there are $\kappa$ simultaneous inequality constraints. The objective function $f_0(x)$ can be any function that produces desirable or "optimal" behavior when minimized. It is desirable to minimize the error between the actual end-effector linear and angular velocity $(v^T\ w^T)_{ee}^T$ and the desired end-effector linear and angular velocity $(v^T\ w^T)_{ee,d}^T$. Thus, the following function was chosen.

$$f_0(x) = ((x - x_d)^T(x - x_d))^{\frac{1}{2}} \quad (3)$$

where $$x = W \begin{pmatrix} v \\ \omega \end{pmatrix}_{ee} \quad (4)$$

$$x_d = W \begin{pmatrix} v \\ \omega \end{pmatrix}_{ee,d}$$

where W is a weighting matrix with appropriate unit terms such that all of the elements of x have the same units:

$$W = \begin{bmatrix} I_{3\times 3} & 0_{3\times 3} \\ 0_{3\times 3} & \alpha I_{3\times 3} \end{bmatrix} \quad (5)$$

For example, a valid choice would be $\alpha=1$m/rad. In other cases it may be desirable to have additional criteria included in the objective function. For example, with redundant manipulators additional terms can be added to the objective function to represent optimal use of the self-motion of the robot, provided the resulting $f_0(x)$ is a convex, twice-differentiable function.

Given the objective function, it is helpful to define the constraint functions $f_i(x)$. Constraints due to joint angle limits and joint velocity limits are generated.

There are two different cases of joint limits: joint angle limits and joint velocity limits. As explained above, it may be desirable to base the dodge velocities on these limits, so it is helpful to accommodate both cases with a single set of upper and lower joint velocity limits. To do this, a vector that contains all of the upper limits on allowable joint velocities at this instant is formed $$\dot{q}_{ul} = \begin{bmatrix} \dot{q}_{ul_1} \\ \vdots \\ \dot{q}_{ul_n} \end{bmatrix} \quad (6)$$

where the value of each $\dot{q}_{ul_i}$ depends on the current angle of joint i:

$$\dot{q}_{ul_i} = \begin{cases} \dot{q}_{upper_i} & q_i < q_{upper_i} \\ 0 & q_i \geq q_{upper_i} \end{cases} \quad (7)$$

That is, the joint i is nominally upper bounded by a user-specified velocity limit (typically the rated velocity limit of the joint), but if joint i has begun to exceed its joint limit its upper velocity limit is 0 and the angle may not be allowed to increase further. A similar vector of lower limits on allowable joint velocities is created:

$$\dot{q}_u = \begin{bmatrix} \dot{q}_{u_1} \\ \vdots \\ \dot{q}_{u_n} \end{bmatrix} \quad (8)$$

where $$\dot{q}_{u_i} = \begin{cases} \dot{q}_{lower_i} & q_i > q_{lower_i} \\ 0 & q_i \le q_{lower_i} \end{cases} \quad (9)$$

Given the values for the upper and lower joint limits in (7) and (9) the instantaneous limit on $\dot{q}_i$ can be stated as $$\dot{q}_{ll_i} \le \dot{q}_i \le \dot{q}_{ul_i} \quad (10)$$

Equation (10) may be restated using (6) and (8) as $$\hat{s}_i^T \dot{q}_{ll} \le \hat{s}_i^T \dot{q} \le \hat{s}_i^T \dot{q}_{ul} \quad (11)$$

where $\hat{s}_i$ is a vector that selects the terms corresponding to the $i^{th}$ joint:

$$\hat{s}_1 = [1\ 0\ \dots\ 0]^T \quad (12)$$

Note that ($\hat{\ }$) notation is used to indicate that a vector is a unit vector. The constraint functions $f_i(x)$ corresponding to the right portion of (11) (i.e. the upper limits) are:

$$\hat{s}_i^T \dot{q} \le \hat{s}_i^T \dot{q}_{ul} \quad (13)$$

using the Jacobian relationship for serial manipulators $$\begin{pmatrix} v \\ \omega \end{pmatrix}_{ee} = J\dot{q} \quad (14)$$

and assuming that the second robotic manipulator is not in a singular configuration, J can be inverted and substitute (14) into (13):

$$\hat{s}_i^T J^{-1} \begin{pmatrix} v \\ \omega \end{pmatrix}_{ee} \le \hat{s}_i^T \dot{q}_{ul}. \quad (15)$$

Using the fact that $w^{-1}w=1$, it can be inserted into (15) and group terms:

$$\underbrace{\hat{s}_i^T J^{-1} W^{-1}}_{k_{li}^T} W \begin{pmatrix} v \\ \omega \end{pmatrix}_{ee} \le \hat{s}_i^T \dot{q}_{ul} \quad (16)$$

where $$k_{li}^T = \hat{s}_i^T J^{-1} W^{-1}. \quad (17)$$

Dividing through by the magnitude of (17) produces:

$$\underbrace{\frac{k_{li}^T}{\|k_{li}^T\|}}_{\hat{a}_{ul_i}^T} W \begin{pmatrix} v \\ \omega \end{pmatrix}_{ee} \le \underbrace{\frac{\hat{s}_i^T}{\|k_{li}^T\|} \dot{q}_{ul}}_{b_{ul_i}}. \quad (18)$$

Thus the upper joint limit on joint i reduces to $$\hat{a}_{ul_i}^T x \le b_{ul_i} \quad (19)$$

The constraint functions $f_i(x)$ corresponding to the left portion of (11) (i.e. the lower limits) may then be created similarly:

$$-\hat{s}_i^T \dot{q} \le -\hat{s}_i^T \dot{q}_{ll} \quad (20)$$

$$-k_{li}^T W \begin{pmatrix} v \\ \omega \end{pmatrix}_{ee} \le -\hat{s}_i^T \dot{q}_{ll} \quad (21)$$

$$\underbrace{-\frac{k_{li}^T}{\|k_{li}^T\|}}_{\hat{a}_{ll_i}^T} W \begin{pmatrix} v \\ \omega \end{pmatrix}_{ee} \le \underbrace{-\frac{\hat{s}_i^T}{\|k_{li}^T\|} \dot{q}_{ll}}_{b_{ll_i}} \quad (22)$$

$$\hat{a}_{ll_i}^T x \le b_{ll_i}. \quad (23)$$

Combining coefficients of (19) and (24) for all n joints produces $$A_{ul} = \begin{bmatrix} \hat{a}_{ul_1}^T \\ \vdots \\ \hat{a}_{ul_n}^T \end{bmatrix} \quad (24)$$

$$b_{ul} = \begin{bmatrix} b_{ul_1} \\ \vdots \\ b_{ul_n} \end{bmatrix}$$

$$A_{ll} = \begin{bmatrix} \hat{a}_{ll_1}^T \\ \vdots \\ \hat{a}_{ll_n}^T \end{bmatrix} \quad (25)$$

$$b_{ll} = \begin{bmatrix} b_{ll_1} \\ \vdots \\ b_{ll_n} \end{bmatrix}$$

Then the set of 2 n constraints due to joint limits simplifies to $$A_l x \le b_l \quad (26)$$

where $$A_l = \begin{bmatrix} A_{ul} \\ A_{ll} \end{bmatrix}$$

$$b_l = \begin{bmatrix} b_{ul} \\ b_{ll} \end{bmatrix}.$$

As described above, the collision and distance check generates pairs of potential collision points: the collision point $cp_i$ and the interfering point $ip_i$. For each potential collision, it desirable to constrain the velocity of $cp_i$ toward $ip_i$. Graphically, this is illustrated in FIG. 9. In FIG. 9*a*, a robotic manipulator and an object near it are represented by their respective geometric primitives (line segments in this case). In FIGS. 9*b* and 9*c* there are dashed lines between the two pairs of possible collision points. FIG. 9*b* shows the potential collision between an external object and the robotic manipulator, and FIG. 9*c* shows the potential collision between the robotic manipulator and itself. In each case a unit vector $\hat{c}_i$ in the collision direction (directed from $cp_i$ towards $ip_i$) is constructed. In addition, the velocity of $cp_i$ is denoted as $v_{cp_i}$ and the velocity of $ip_i$ is denoted as $v_{ip_i}$.

The limit on the motion of $cp_i$ towards $ip_i$ may be restated as $$\hat{c}_i^T V_{cp_i} \le v_{ai} \quad (27)$$

where $\upsilon_{ai}$ is the greatest allowed "approach velocity" of $cp_i$ towards $ip_i$. The manner in which $\upsilon_{ai}$ is specified can be varied depending on the desired collision avoidance behavior. In the described embodiments, multiple shells (reaction, equilibrium, and safety) have been constructed for each body in order to create a smoothed approach velocity $\upsilon_{ai}$, which is expressed as:

$$\upsilon_{a_i} = \hat{c}_i^T v_{ip_i} + \frac{\upsilon_{half_i}}{\ln(0.5)} \ln\left(\frac{r_{ri} - d_{p_i}}{r_{ri} - r_{e_i}}\right) \quad (28)$$

where $d_{pi}$ is the distance $cp_i$ between $ip_i$, $r_{ri}$ towards is the sum of the reaction radii of the two bodies, $r_{ei}$ is the sum of the equilibrium radii of the two objects, and $\upsilon_{halfi}$ is the greatest approach velocity allowed when $d_{pi}$ is halfway between $r_{ri}$ and $r_{ei}$. The resulting greatest allowed approach velocity is plotted in FIG. 10 as a function of the separation distance. Note that the equation is valid (and thus used) when $r_{ri} > d_i > 0$.

When the objects are separated by exactly the sum of their equilibrium radii, the avoidance velocity should equal the velocity of the interfering point along the collision direction to ensure that they do not get any closer. As the separation distance increases to the sum of the reaction radii, the avoidance velocity increases to infinity, effectively ignoring the constraint. When the objects are closer than the sum of their equilibrium radii, the avoidance velocity is lowered to force them apart. If $d_{pi}$ drops below $r_{si}$ (the sum of the safety radii of the two bodies) an emergency stop of the robotic apparatus may be triggered. Note that the rule chosen in (29) can be replaced by any equivalent function.

Given $\upsilon_{ai}$ the left side of (28) should be expanded to express the velocity of $cp_i$ in terms of the robot joint velocities. This is accomplished by treating $cp_i$ as if it were the end-effector of the robotic apparatus and creating a "partial Jacobian matrix" ($J_{cp_i}$) for this point. In other words, the robot is virtually truncated at $cp_i$ and the effects of joints between $cp_i$ and the robot base are considered. Utilizing the Jacobian relationship for serial manipulators $v_{cp_i}$ is expressed as $$v_{cp_i} = J_{cp_i} \dot{q} \quad (29)$$

In the case shown in FIG. 9b where the potential collision is between the robot and another object $J_{cp_i}$ is $$J_{cp_i} = \begin{bmatrix} \frac{(v_{cp_i})_x}{\dot{q}_1} & \cdots & \frac{(v_{cp_i})_x}{\dot{q}_\mu} & 0 & \cdots & 0 \\ \frac{(v_{cp_i})_y}{\dot{q}_1} & \cdots & \frac{(v_{cp_i})_y}{\dot{q}_\mu} & 0 & \cdots & 0 \\ \frac{(v_{cp_i})_z}{\dot{q}_1} & \cdots & \frac{(v_{cp_i})_z}{\dot{q}_\mu} & 0 & \cdots & 0 \end{bmatrix} \quad (30)$$

where there are $\mu$ joints between $cp_i$ and the ground. In the case of potential collision between the robotic manipulator and itself, as is shown in FIG. 9c, the motion of the joints below does not affect the distance between $cp_i$ and $ip_i$.

Thus the effects of these joints can be ignored and $J_{cp_i}$ can be formulated as $$J_{cp_i} = \begin{bmatrix} 0 & \cdots & 0 & \frac{(v_{cp_i})_x}{\dot{q}_\eta} & \cdots & \frac{(v_{cp_i})_x}{\dot{q}_\mu} & 0 & \cdots & 0 \\ 0 & \cdots & 0 & \frac{(v_{cp_i})_y}{\dot{q}_\eta} & \cdots & \frac{(v_{cp_i})_y}{\dot{q}_\mu} & 0 & \cdots & 0 \\ 0 & \cdots & 0 & \frac{(v_{cp_i})_z}{\dot{q}_\eta} & \cdots & \frac{(v_{cp_i})_z}{\dot{q}_\mu} & 0 & \cdots & 0 \end{bmatrix} \quad (31)$$

where there are $\eta-1$ joints between $ip_i$ and the ground. Substituting (30) into (28) produces $$\hat{c}_i^T J_{cp_i} \dot{q} \leq \upsilon_{ai} \quad (32)$$

Using (14) and substituting for $\dot{q}$ $$\hat{c}_i^T J_{cp_i} J^{-1} \begin{pmatrix} v \\ \omega \end{pmatrix}_{ee} \leq \upsilon_{a_i} \quad (33)$$

and using the same approach as (16), $w^{-1}w$ is inserted and terms are grouped:

$$\hat{c}_i^T J_{cp_i} J^{-1} W^{-1} W \begin{pmatrix} v \\ \omega \end{pmatrix}_{ee} \leq \upsilon_{a_i} \quad (34)$$

$$k_{c_i}^T = \hat{c}_i^T J_{cp_i} J^{-1} W^{-1} \quad (35)$$

Eqn. (35) is thus reduced to $$k_{c_i}^T W \begin{pmatrix} v \\ \omega \end{pmatrix}_{ee} \leq \upsilon_{a_i} \quad (36)$$

Dividing through by the magnitude of (36) produces:

$$\underbrace{\frac{k_{c_i}^T}{\|k_{c_i}^T\|}}_{\hat{a}_{c_i}^T} W \underbrace{\begin{pmatrix} v \\ \omega \end{pmatrix}_{ee}}_{x} \leq \underbrace{\frac{\upsilon_{a_i}}{\|k_{c_i}^T\|}}_{b_{c_i}} \quad (37)$$

Thus the limits due to the potential collision (28) reduce to $$\hat{a}_{ci}^T x \leq b_{ci} \quad (38)$$

Combining the coefficients of (39) for m potential collisions produces $$A_c = \begin{bmatrix} \hat{a}_{c_1}^T \\ \vdots \\ \hat{a}_{c_m}^T \end{bmatrix} \quad (39)$$

$$b_c = \begin{bmatrix} b_{c_1} \\ \vdots \\ b_{c_m} \end{bmatrix}$$

which can be combined with (26)

$$A = \begin{bmatrix} A_l \\ A_c \end{bmatrix} \quad (40)$$

$$b = \begin{bmatrix} b_l \\ b_c \end{bmatrix}$$

such that the constraints on the manipulator's velocity due to joint angle limits, joint velocity limits, potential collisions with other objects, and potential collisions with itself are expressed within the single set of equations $$Ax \leq b \quad (41)$$

To achieve the desired form of the constraints, (42) is rearranged to $$Ax - b \leq 0 \quad (42)$$

where each $f_i(x)$ is represented by the row of the left side of (43). Thus the total number of constraints is k=2 n+m.

Before continuing, the special cases that cause this method to fail shall be discussed. First, it is helpful for the robotic manipulator to be in a non-singular configuration. This is typically achieved through appropriate selection of joint limits to avoid singular configurations or using additional software to transition the robotic manipulator through the singularity and then resuming the collision avoidance algorithm. Also, in the case where the range space of $J_{cp_i}$ (i.e. the set of all possible velocities of $cp_i$) is orthogonal to $\hat{c}_i$, then the left side of (33) equals zero regardless of the choice of $\dot{q}$. In this case the robotic manipulator cannot move $cp_i$ away from $ip_i$ at this instant. This scenario is rare, and can be overcome by adding additional logic that commands the robotic manipulator to move $cp_i$ such that the orthogonality condition changes and the collision avoidance algorithm can resume.

Restating (2), the collision avoidance algorithm has been reduced to a constrained optimization of the form:

$$\text{minimize } f_0(x)$$

$$\text{subject to } f_i(x) \leq 0, i=1, \ldots, \kappa \quad (43)$$

The objective function $f_0(x)$ and constraint functions $f_1(x), \ldots, f_0(x)$ are detailed in (3) and (42), respectively. In addition, $f_0, \ldots, f_\kappa: R^q \to R$ are convex and twice continuously differentiable. Thus convex optimization techniques are applicable.

Convex optimization is a subject of extensive study within mathematics. Here, an interior point method of solving the convex optimization has been chosen. In particular, the logarithmic barrier method is employed. This method is well-suited because it is very fast, can handle an arbitrarily large number of inequality constraints, and the accuracy of the result (bounding the error) can be mathematically proven.

Briefly, the optimization is illustrated in FIG. 4, where each constraint $f_i(x)$ creates a set of velocities that are disallowed. When all κ constraints are combined, the remaining set of allowable velocities is convex. The basic approach of the logarithmic barrier method is to model each inequality constraint as a logarithmic penalty function that grows to infinity as x approaches the $f_i(x)=0$ barrier. These penalty functions are added to the objective function $f_0(x)$, and an unconstrained optimization of x is performed via an iterative descent method (typically Newton's method). This value of x is then refined by scaling the magnitude of the penalty functions and again optimizing x via the descent method. This process is iterated to find $x_{opt}$, the optimal value of x. Then using (4) and (14) the optimal joint velocities $\dot{q}_{opt}$ are $$\dot{q}_{opt} = J^{-1} W^{-1} x_{opt} \quad (44)$$

These joint velocities are commanded to the robotic manipulator. After they are executed for the duration of the specified time interval, the algorithm is repeated.

With respect to flowchart 30 of FIG. 7, a method of operating a robotic apparatus according to a collision avoidance scheme is now described. After the start (at Block 31), at Block 32 a first robotic manipulator is moved along a first pre-planned actual path. At Block 33, a second robotic manipulator is moved along a second pre-planned intended path.

At Block 34, a distance between the second robotic manipulator and the first robotic manipulator is determined and compared to a threshold distance to determine a potential collision. At Block 35, a decision is made. If there is no potential collision, at Block 36, the movement of the second robotic manipulator along the second pre-planned intended path is continued. If there is a potential collision, at Block 37, the second movement of the second robotic manipulator is deviated from the second pre-planned intended path to move in a dodge path away from, but closely following, the first pre-planned actual path. Block 38 indicates the end of the method.

Many modifications and other embodiments of the invention will come to the mind of one skilled in the art having the benefit of the teachings presented in the foregoing descriptions and the associated drawings. Therefore, it is understood that the invention is not to be limited to the specific embodiments disclosed, and that modifications and embodiments are intended to be included within the scope of the appended claims.

What is claimed is:

1. A robotic apparatus implementing a collision avoidance scheme, comprising:
   a first robotic manipulator;
   a first controller configured to control said first robotic manipulator for movement along a first pre-planned actual path; and
   a second robotic manipulator; and
   a second controller configured to store geometric models of said first and second robotic manipulators, and control movement of said second robotic manipulator for movement along a second pre-planned intended path and deviating therefrom to move in a dodging path away from the first pre-planned actual path based upon determining a potential collision with said first robotic manipulator based upon the geometric models and without prior knowledge of the first pre-planned actual path.

2. The robotic apparatus of claim 1, wherein said second controller is configured to repeatedly determine a distance between said second robotic manipulator and said first robotic manipulator based upon the geometric models, and determine a potential collision with said first robotic manipulator based upon the distance.

3. The robotic apparatus of claim 2, wherein each geometric model includes a series of buffer zones surrounding a respective robotic manipulator; and wherein said second controller is configured to determine a potential collision between said second robotic manipulator and said first robotic manipulator based upon an overlap between the respective buffer zones of said second robotic manipulator and said first robotic manipulator.

4. The robotic apparatus of claim 3, wherein said second controller is configured to move said second robotic manipulator at different speeds based upon which respective buffer zones are overlapping.

5. The robotic apparatus of claim 1, wherein said first robotic manipulator comprises at least one joint; and wherein said second controller is configured to determine the potential collision based upon positioning of the at least one joint.

6. The robotic apparatus of claim 1, further comprising a visual sensor; and wherein said second controller is configured to determine the potential collision based upon said visual sensor.

7. The robotic apparatus of claim 1, wherein said second controller is configured to repeatedly determine a distance between said second robotic manipulator and said first robotic manipulator, and compare the distance to at least one threshold distance to thereby determine a potential collision.

8. The robotic apparatus of claim 7, wherein said second controller is configured to repeatedly determine an approach velocity between said second robotic manipulator and said first robotic manipulator, and determine the potential collision based upon the approach velocity.

9. The robotic apparatus of claim 8, wherein said second controller is configured to move said second robotic manipulator at different speeds based upon the approach velocity.

10. The robotic apparatus of claim 1, wherein said second controller is configured to repeatedly determine an acceleration of said first robotic manipulator, and determine the potential collision based upon the acceleration.

11. The robotic apparatus of claim 1, wherein the second pre-planned intended path is based upon a sequence of desired velocities; and wherein said second controller is configured to move said second robotic manipulator along the dodging path based upon a sequence of dodge velocities to avoid the potential collisions while closely following the sequence of desired velocities of the second pre-planned intended path.

12. A robotic apparatus implementing a collision avoidance scheme to avoid a collision with a first robotic manipulator controlled by a first controller for movement along a first pre-planned actual path, the robotic apparatus comprising:
a second robotic manipulator; and
a second controller configured to store geometric models of said first and second robotic manipulators, and control movement of said second robotic manipulator for movement along a second pre-planned intended path and deviating therefrom to move in a dodging path away from the first pre-planned actual path based upon determining a potential collision with the first robotic manipulator based upon the geometric models and without prior knowledge of the first pre-planned actual path.

13. The robotic apparatus of claim 12, wherein said second controller is configured to repeatedly determine a distance between said second robotic manipulator and said first robotic manipulator based upon the geometric models, and determine a potential collision with said first robotic manipulator based upon the distance.

14. The robotic apparatus of claim 13, wherein each geometric model includes a series of buffer zones surrounding a respective robotic manipulator; and wherein said second controller is configured to determine a potential collision between said second robotic manipulator and the first robotic manipulator based upon an overlap between the respective buffer zones of said second robotic manipulator and said first robotic manipulator.

15. The robotic apparatus of claim 14, wherein said second controller is configured to move said second robotic manipulator at different speeds based upon which respective buffer zones are overlapping.

16. The robotic apparatus of claim 12, wherein the first robotic manipulator comprises at least one joint; and wherein said second controller is configured to determine the potential collision based upon positioning of the at least one joint.

17. The robotic apparatus of claim 12, further comprising a visual sensor; and wherein said second controller is configured to determine the potential collision based upon said visual sensor.

18. The robotic apparatus of claim 12, wherein said second controller is configured to repeatedly determine a distance between said second robotic manipulator and the first robotic manipulator, and compare the distance to at least one threshold distance to thereby determine a potential collision.

19. The robotic apparatus of claim 12, wherein said second controller is configured to repeatedly determine an approach velocity between said second robotic manipulator and the first robotic manipulator, and determine the potential collision based upon the approach velocity.

20. A method of implementing a collision avoidance scheme to avoid a collision of a second robotic manipulator with a first robotic manipulator controlled for movement along a first pre-planned actual path, the method comprising:
operating a second controller to store geometric models of the first and second robotic manipulators, and control movement of the second robotic manipulator for movement along a second pre-planned intended path and deviating therefrom to move in a dodging path away from the first pre-planned actual path based upon determining a potential collision with the first robotic manipulator based upon the geometric models and without prior knowledge of the first pre-planned actual path.

21. The method of claim 20, further comprising operating the second controller to repeatedly determine a distance between the second robotic manipulator and the first robotic manipulator based upon the geometric models, and determine a potential collision with the first robotic manipulator based upon the distance.

22. The method of claim 21, wherein each geometric model includes a series of buffer zones surrounding a respective robotic manipulator; and further comprising operating the second controller to determine a potential collision between the second robotic manipulator and the first robotic manipulator based upon an overlap between the respective buffer zones of the second robotic manipulator and the first robotic manipulator.

23. The method of claim 22, further comprising operating the second controller to move the second robotic manipulator at different speeds based upon which respective buffer zones are overlapping.

* * * * *